US012604301B2

(12) United States Patent　(10) Patent No.:　US 12,604,301 B2
Lin　(45) Date of Patent:　Apr. 14, 2026

(54) USER EQUIPMENT AND RESOURCE MONITORING METHOD USING A RE-EVALUATION AND PRE-EMPTION CHECKING PROCEDURE FOR DETERMINING A SUBSET OF RESOURCES IN A SLOT FOR SIDELINK COMMUNICATIONS

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 333 days.

(21) Appl. No.: 18/371,690

(22) Filed: Sep. 22, 2023

(65) Prior Publication Data

US 2024/0015703 A1　Jan. 11, 2024

Related U.S. Application Data

(63) Continuation of application No. PCT/CN2022/084403, filed on Mar. 31, 2022.

(Continued)

(51) Int. Cl.
*H04W 72/40*　(2023.01)
*H04W 72/02*　(2009.01)
(Continued)

(52) U.S. Cl.
CPC ....... *H04W 72/02* (2013.01); *H04W 72/0446* (2013.01); *H04W 72/25* (2023.01);
(Continued)

(58) Field of Classification Search
CPC ..... H04W 72/25; H04W 72/40; H04W 28/20; H04L 47/46; H04B 17/382
See application file for complete search history.

(56) References Cited

U.S. PATENT DOCUMENTS

2023/0022691 A1* 1/2023 Ji ........................... H04W 72/02
2023/0247652 A1* 8/2023 Du ......................... H04W 72/02
370/329

(Continued)

FOREIGN PATENT DOCUMENTS

CN　110856270 A　2/2020
CN　112512008 A　3/2021
(Continued)

OTHER PUBLICATIONS

R2-2009253, "Correction to pre-emption check for Sidelink resource allocation mode 2", Nov. 2-13, 2020, pp. 1-4 (Year: 2020).*
ETSI, "TS 138 214 V16.4.0", Jan. 2021, pp. 1-173 (Year: 2021).*
R2-1902285, "Considerations on Channel Structures in Sensing Slots for NR V2X Sidelink", Feb. 25-Mar. 1, 2019, pp. 1-4 (Year: 2019).*

(Continued)

*Primary Examiner* — Salvador E Rivas
(74) *Attorney, Agent, or Firm* — BAYES PLLC

(57) ABSTRACT

A user equipment (UE) and a resource monitoring method in sidelink communication are disclosed. The resource monitoring method in sidelink communication by the UE includes being triggered, by a higher layer, to determine a subset of resources in a first resource selection window as a part of a re-evaluation and pre-emption checking procedure, wherein the first resource selection window is within a set of candidate slots.

18 Claims, 3 Drawing Sheets

<div style="display: flex;">

<div>

Related U.S. Application Data

(60) Provisional application No. 63/170,748, filed on Apr. 5, 2021.

(51) Int. Cl.

| | | |
|---|---|---|
| *H04W 72/0446* | (2023.01) | |
| *H04W 72/25* | (2023.01) | |
| *H04B 17/382* | (2015.01) | |
| *H04W 28/20* | (2009.01) | |

(52) U.S. Cl.
CPC ........... *H04W 72/40* (2023.01); *H04B 17/382* (2015.01); *H04W 28/20* (2013.01)

(56) References Cited

U.S. PATENT DOCUMENTS

| | | | |
|---|---|---|---|
| 2023/0254878 A1* | 8/2023 | Dong ..................... | H04W 72/40 |
| 2024/0015841 A1* | 1/2024 | Ji .......................... | H04W 24/02 |

FOREIGN PATENT DOCUMENTS

| | | |
|---|---|---|
| WO | 2020222532 A1 | 11/2020 |
| WO | 2021030561 A1 | 2/2021 |

</div>

<div>

OTHER PUBLICATIONS

Oppo, "Discussion on power saving in NR sidelink communication", R1-2111300, 3GPP TSG RAN WG1 #107-e e-Meeting, Nov. 11-19, 2021.

NTT DOCOMO, Inc., "Maintenance for resource allocation mechanism mode 2", R1-2006695, 3GPP TSG RAN WG1 #102 e-Meeting, Aug. 17-28, 2020.

International Search Report issued in International application No. PCT/CN2022/084403, mailed Jun. 27, 2022.

Written Opinion of the International Searching Authority issued in International application No. PCT/CN2022/084403, mailed Jun. 27, 2022.

Extended European Search Report issued in corresponding European application No. 22783943.8, mailed May 31, 2024.

Source: LG Electronics; Title: Discussion on resource allocation for power saving; R1-2100517 3GPP TSG RAN WG1 Meeting #104-e e-Meeting, Jan. 25-Feb. 5, 2021.

Source: Moderator (OPPO); Title: FL summary for AI 8.11.1.1—resource allocation for power saving; R1-2101412 3GPP TSG RAN WG1 #104-e e-Meeting, Jan. 25-Feb. 5, 2021.

Source: Huawei, HiSilicon; Title: Remaining details of sidelink resource allocation mode 2; R1-2007612 3GPP TSG RAN WG1 Meeting #103-e E-meeting, Oct. 26-Nov. 13, 2020.

* cited by examiner

</div>

</div>

30

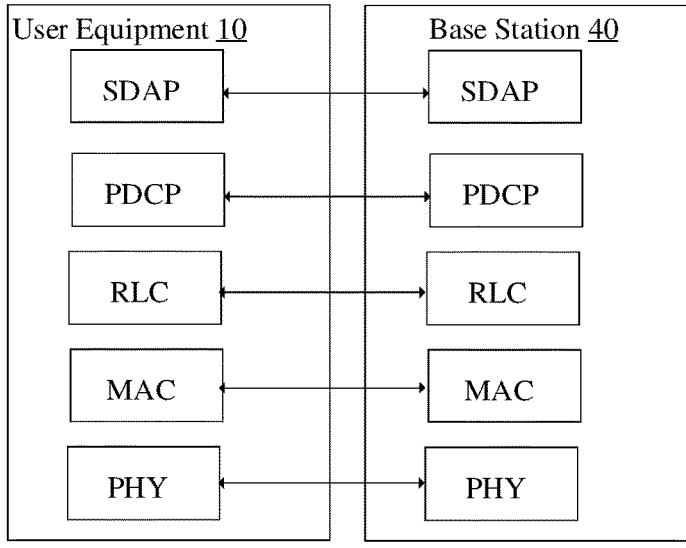
FIG. 3
410
412 — Being triggered, by a higher layer, to determine a subset of resources in a first resource selection window as a part of a re-evaluation and pre-emption checking procedure, wherein the first resource selection window is within a set of candidate slots
FIG. 4
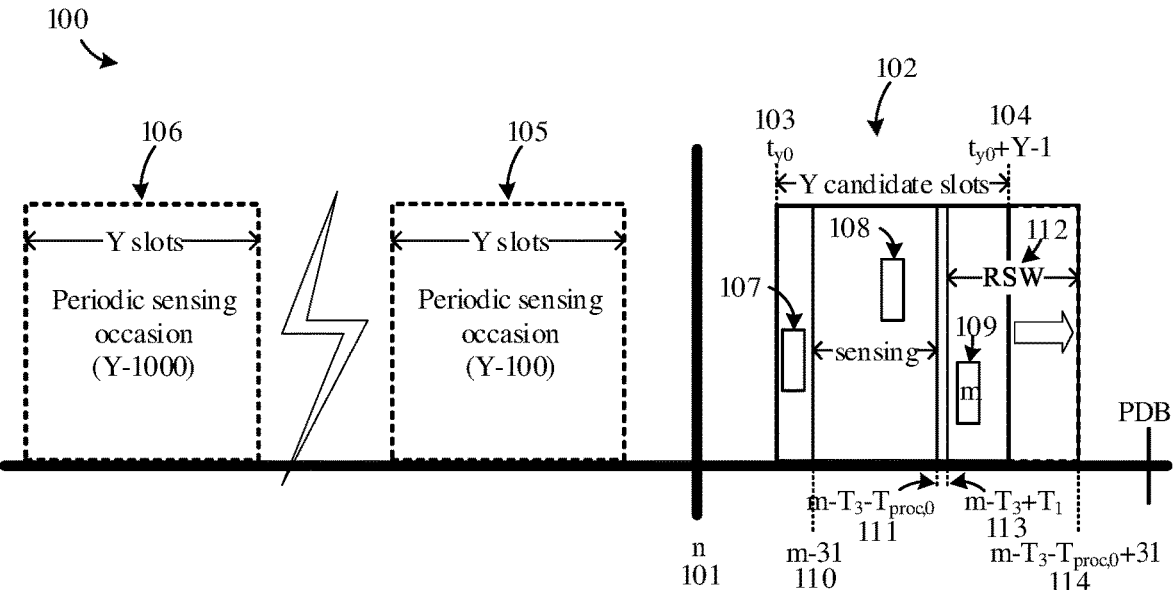
FIG. 5

USER EQUIPMENT AND RESOURCE MONITORING METHOD USING A RE-EVALUATION AND PRE-EMPTION CHECKING PROCEDURE FOR DETERMINING A SUBSET OF RESOURCES IN A SLOT FOR SIDELINK COMMUNICATIONS

CROSS-REFERENCE TO RELATED APPLICATION

This application is a continuation application of International Patent Application No. PCT/CN2022/084403, entitled "USER EQUIPMENT AND RESOURCE MONITORING METHOD IN SIDELINK COMMUNICATION" filed on Mar. 31, 2022, which claims the benefit of priority to U.S. provisional Application No. 63/170,748, filed on Apr. 5, 2021, both of which are incorporated herein by reference in their entireties.

TECHNICAL FIELD

The present disclosure relates to the field of communication systems, and more particularly, to a user equipment (UE) and a resource monitoring method in sidelink (SL) communication, which can provide a good communication performance and/or provide high reliability.

BACKGROUND

In the advancement of radio wireless technology for vehicle-to-everything (V2X) transmission, 5th generation (5G) new radio (NR) based sidelink (SL) communication was developed by 3rd generation partnership project (3GPP) in Release 16, which is also commonly known as NR-V2X or simply NR-V.

If a remaining time interval from previously used candidate slots/window for selection is very limited, as such there is insufficient amount of resources can be used for a resource re-selection (after a re-evaluation and pre-emption checking), this also poses a problem for a transmitting user equipment (TX UE) to find a suitable and appropriate replacement resource for SL transmission.

SUMMARY

In a first aspect of the present disclosure, a user equipment (UE) includes a memory, a transceiver, and a processor coupled to the memory and the transceiver. The processor is configured to be triggered, by a higher layer, to determine a subset of resources in a first resource selection window as a part of a re-evaluation and pre-emption checking procedure, and the first resource selection window is within a set of candidate slots.

In a second aspect of the present disclosure, a resource monitoring method in sidelink communication by a user equipment (UE) includes being triggered, by a higher layer, to determine a subset of resources in a first resource selection window as a part of a re-evaluation and pre-emption checking procedure, wherein the first resource selection window is within a set of candidate slots.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 3 is a schematic diagram illustrating a control plane protocol stack according to an embodiment of the present disclosure.

FIG. 4 is a flowchart illustrating a resource monitoring method in sidelink communication by a user equipment (UE) according to an embodiment of the present disclosure.

FIG. 5 is a schematic diagram illustrating an exemplary illustration of a proposed resource selection window extension beyond an ending boundary of Y candidate slots in periodic-based partial sensing according to an embodiment of the present disclosure.

DETAILED DESCRIPTION

Figure 1:
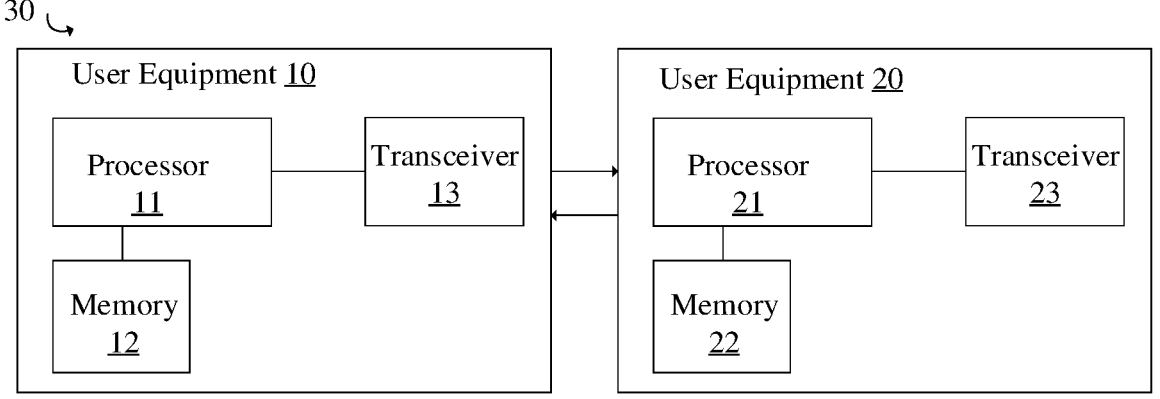
FIG. 1 is a block diagram of user equipments (UEs) of communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In the advancement of radio wireless technology for vehicle-to-everything (V2X) transmission, 5th generation (5G) new radio (NR) based sidelink (SL) communication was developed by 3rd generation partnership project (3GPP) in Release 16, which is also commonly known as NR-V2X or simply NR-V. The NR-V of sidelink communication technology was designed and developed to support both road safety centric basic applications and advanced V2X use cases, e.g., sending basic safety and emergency warning messages directly from one vehicle to another with vehicle's direction, acceleration/braking status, types of warning, and etc., to avoid traffic accidents and to help emergency vehicles travelling safely and smoothly on the road.

As part of resource allocation mechanism when a device terminal operates in a sidelink resource allocation mode 2 (as known as "UE selected" or simply "selected" mode) and a sidelink resource pool (RP), in which the terminal operates in, supports periodic resource reservation (i.e., when reservation for initial transmission of a different TB is enabled for the RP), a transmitting user equipment (TX UE) terminal performs a periodic-based partial sensing (if it is a power constrained UE) to obtain pre-sensing results to avoid selecting/re-selecting a resource that is already reserved by another UE for periodic transmission. In addition, a selected and/or reserved resource by the TX UE can be re-evaluated and/or pre-emption checked at least once just before it is used for the transmission of a sidelink medium access control (MAC) protocol data unit (PDU)/transport block (TB). This can further minimize a chance of a collision/conflict with sidelink transmission from another UE. If a potential collision/conflict is detected during the re-evaluation and pre-emption checking, the affected resource would need to be re-selected.

However, if the remaining time interval from the previously used candidate slots/window for selection is very limited, as such there is insufficient amount of resources can be used for the resource re-selection (after the re-evaluation and pre-emption checking), this also poses a problem for the TX UE to find a suitable and appropriate replacement resource for the SL transmission.

Therefore, there is a need for a user equipment (UE) and a resource monitoring method, which can solve issues in the prior art, ensure an entire portion of a resource selection window is covered by sensing results obtained from a periodic-based partial sensing performed by the UE, avoid transmission collision, provide a good communication performance, and/or provide high reliability.

In some embodiments of the present disclosure, proposed exemplarily methods for selection and re-selection of sidelink (SL) transmission resources with partial sensing in resource allocation mode 2 are disclosed. The proposed exemplarily methods aim to create more available resources when SL resource re-selection needs to be performed by a UE due to, for example, part of re-evaluation and pre-emption checking procedure when one of pre-selected or reserved resources is no longer part of reported candidate resources to a higher layer.

FIG. 1 illustrates that, in some embodiments, one or more user equipments (UEs) 10 (such as a first UE) and one or more user equipments (UEs) 20 (such as a second UE) of communication in a communication network system 30 according to an embodiment of the present disclosure are provided. The communication network system 30 includes one or more UEs 10 and one or more UE 20. The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21 and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond, for example providing cellular-vehicle to everything (C-V2X) communication.

In some embodiments, the UE 10 may be a sidelink packet transport block (TB) transmission UE (Tx-UE). The UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

Figure 2:
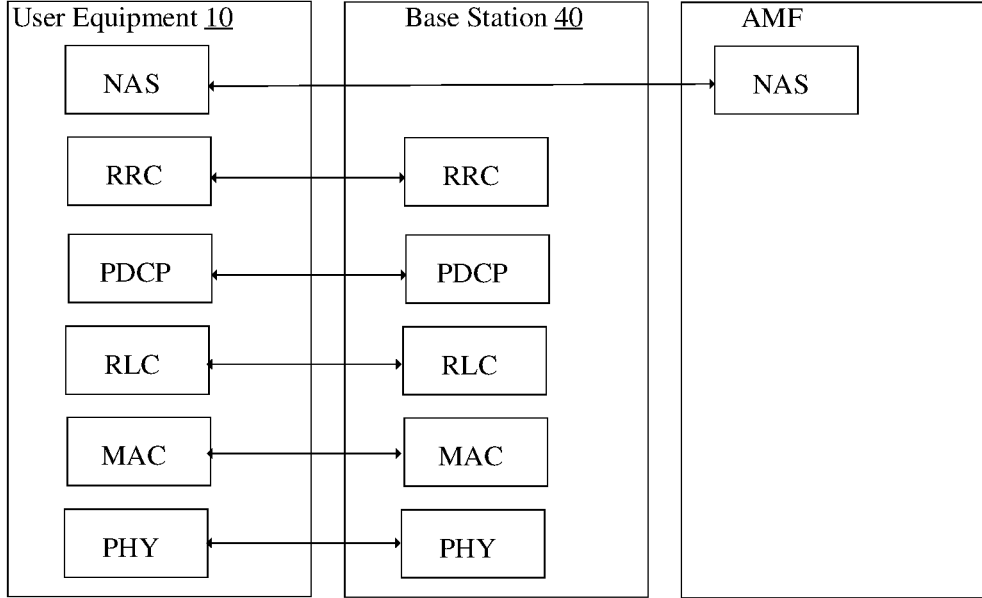
FIG. 2 is a schematic diagram illustrating a user plane protocol stack according to an embodiment of the present disclosure.

FIG. 2 illustrates an example user plane protocol stack according to an embodiment of the present disclosure. FIG. 2 illustrates that, in some embodiments, in the user plane protocol stack, where service data adaptation protocol (SDAP), packet data convergence protocol (PDCP), radio link control (RLC), and media access control (MAC) sublayers and physical (PHY) layer may be terminated in a UE 10 and a base station 40 (such as gNB) on a network side. In an example, a PHY layer provides transport services to higher layers (e.g., MAC, RRC, etc.). In an example, services and functions of a MAC sublayer may comprise mapping between logical channels and transport channels, multiplexing/demultiplexing of MAC service data units (SDUs) belonging to one or different logical channels into/from transport blocks (TBs) delivered to/from the PHY layer, scheduling information reporting, error correction through hybrid automatic repeat request (HARQ) (e.g. one HARQ entity per carrier in case of carrier aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or transmission time interval (TTI) durations. In an example, automatic repeat request (ARQ) may operate on any of the numerologies and/or TTI durations the logical channel is configured with. In an example, services and functions of the PDCP layer for the user plane may comprise sequence numbering, header compression, and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping quality of service Indicator (QFI) in downlink (DL) and uplink (UL) packets. In an example, a protocol entity of SDAP may be configured for an individual PDU session.

FIG. 3 illustrates an example control plane protocol stack according to an embodiment of the present disclosure. FIG. 2 illustrates that, in some embodiments, in the control plane protocol stack where PDCP, RLC, and MAC sublayers and PHY layer may be terminated in a UE 10 and a base station 40 (such as gNB) on a network side and perform service and functions described above. In an example, RRC used to control a radio resource between the UE and a base station (such as a gNB). In an example, RRC may be terminated in a UE and the gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of signaling radio bearers (SRBs) and data radio bearers (DRBs), mobility functions, QoS management functions, UE measurement reporting and control of the reporting, detection of and recovery from radio link failure, and/or non-access stratum (NAS) message transfer to/from NAS from/to a UE. In an example, NAS control protocol may be terminated in the UE and AMF on a network side and may perform functions such as authentication, mobility management between a UE and an AMF for 3GPP access and non-3GPP access, and session management between a UE and a SMF for 3GPP access and non-3GPP access.

When a specific application is executed and a data communication service is required by the specific application in the UE, an application layer taking charge of executing the specific application provides the application-related information, that is, the application group/category/priority information/ID to the NAS layer. In this case, the application-related information may be pre-configured/defined in the UE. (Alternatively, the application-related information is received from the network to be provided from the AS (RRC) layer to the application layer, and when the application layer starts the data communication service, the application layer requests the information provision to the AS (RRC) layer to receive the information.)

In some embodiments, the processor 11 or 21 is configured to be triggered, by a higher layer, to determine a subset of resources in a first resource selection window as a part of a re-evaluation and pre-emption checking procedure, wherein the first resource selection window is within a set of candidate slots. This can solve issues in the prior art, ensure an entire portion of a resource selection window is covered by sensing results obtained from a periodic-based partial sensing performed by the UE, avoid transmission collision, provide a good communication performance, and/or provide high reliability.

FIG. 4 illustrates a resource monitoring method 410 in sidelink communication by a user equipment (UE) according to an embodiment of the present disclosure. In some embodiments, the method 410 includes: a block 412, being triggered, by a higher layer, to determine a subset of resources in a first resource selection window as a part of a re-evaluation and pre-emption checking procedure, wherein the first resource selection window is within a set of candidate slots. This can solve issues in the prior art, ensure an entire portion of a resource selection window is covered by sensing results obtained from a periodic-based partial sensing performed by the UE, avoid transmission collision, provide a good communication performance, and/or provide high reliability.

In some embodiments, the set of candidate slots of a length Y starting from a slot ($t_{y_0}$) and/or ending at a slot ($t_{y_0}+Y-1$) is used in an initial resource selection. In some embodiments, the first resource selection window is a remaining portion of the set of candidate slots. In some embodiments, the method further includes sensing slots of a sidelink resource pool within a time interval contiguously from a slot (m−31) to a slot (m−$T_3$−$T_{proc,0}$) to obtain sensing results as a part of a contiguous partial sensing, where the UE is triggered to determine the subset of resources in a slot (n) as the part of the re-evaluation and pre-emption checking procedure and m is a smallest candidate resource slot index after slot (n+$T_3$). In some embodiments, the time interval is within the set of candidate slots. In some embodiments, the time interval is within the first resource selection window. In some embodiments, the higher layer selects earliest resources or prioritize earlier resources within the subset of resources and/or the set of candidate slots for selection.

In some embodiments, the method further includes being triggered, by the higher layer, to determine the subset of resources in a second resource selection window as the part of the re-evaluation and pre-emption checking procedure. In some embodiments, the second resource selection window exceeds an ending boundary of the set of candidate slots. In some embodiments, the second resource selection window exceeds an ending boundary of the set of candidate slots for up to a slot $$\left(m - T_3 - T_{proc,0}^{SL} + 31\right).$$

In some embodiments, a starting of the second resource selection window is a slot (m−$T_3$+$T_1$), where $T_1$ is to be selected by the UE between 0 and $$T_{proc,1}^{SL}.$$

In some embodiments, a number of slots for $$T_{proc,0}^{SL}$$

is selected from a set of values [1, 1, 2, 4] depending on a configured subcarrier spacing (SCS) for a sidelink bandwidth part in which the sidelink resource pool is configured. In some embodiments, for the second resource selection window, $t_{y_0}+Y-1-m$ is smaller or equal to 20% of Y.

FIG. 5 illustrates an exemplary illustration of a proposed resource selection window extension beyond an ending boundary of Y candidate slots in periodic-based partial sensing according to an embodiment of the present disclosure. In some embodiments, for a sidelink resource pool that supports reservation for an initial transmission of a different transport block (TB) (i.e., reservation of future resources based on a SL transmission periodicity of medium access control (MAC) protocol data units (PDUs)/TBs), periodic-based partial sensing is performed by a SL transmitting user equipment (TX UE). In reference to diagram 100 in FIG. 5, for a SL resource (re)selection procedure triggered by a higher layer (such as a MAC layer) in slot (n) 101, the UE (such as a physical layer) selects a set of candidate slots of length Y 102, starting from slot ($t_{y_0}$) 103 and ending in slot ($t_{y_0}+Y-1$) 104, for which a subset of resources is to be reported to the higher layer for resource (re-)selection. In order to determine the subset of candidate/available resources for the reporting, the UE (such as physical layer) needs to identify and exclude all unavailable resources that have been previously reserved by other UEs within the Y candidate slots.

In some embodiments, the UE obtains pre-sensing results prior to the resource (re)selection procedure trigger in slot (n) 101 by monitoring slots in sensing occasions that correspond to Y selected candidate slots 102 based on reservation periodicities supported for the SL resource pool. Assuming the set of reservation periodicities supported for the SL resource pool are 1000 ms and 100 ms, the UE (such as physical layer) needs to have monitored slots in periodic sensing occasions (Y−100) 105 and (Y−1000) 106 to obtain pre-sensing results in terms of SL resource reservations that may occur within the time interval of Y candidate slots 102 and exclude these reserved resources from a candidate resource set then reports remaining candidates (subset of resources) to the higher layer. The higher layer (such as MAC layer) based on the reported subset of candidate resources that are within the Y candidate slots 102, it performs an initial selection of one or more resources for the SL transmission of a MAC PDU/TB in the current transmission period. For the illustrated example in diagram 100 of FIG. the higher layer selects 3 resources (107, 108 and 109) during an initial selection within the Y candidate slots 102.

Before each SL transmission using one of the initially selected resources, the higher layer triggers a re-evaluation and pre-emption checking procedure for the SL resource to be used. That is, the initially selected resources 107, 108 and 109 would need to be re-evaluated and pre-emption checked just before they are used for SL transmission to ensure they have not been reserved or taken over by another UE with higher priority. When it is found an initial selected resource is reserved or taken over by another UE (i.e., no longer part of the remaining candidate resource set during the re-evaluation and pre-emption checking process), the initially selected resource can be removed from a sidelink grant and replaced by a new resource which is to be re-selected from the remaining candidate resource set reported from the UE (physical layer).

In the illustrated example of diagram 100, assuming the initially selected resource 109 in slot m is due for re-evaluation and pre-emption checking. In order to do this, the higher layer triggers the UE (physical layer) to perform a re-evaluation and pre-emption checking procedure in slot m−T$_3$ just before the SL transmission to determine whether or not the resource 109 is still available. As such, the UE monitors slots belong to the SL resource pool within a sensing interval contiguously from slot (m−31) 110 to slot (m−T$_3$−T$_{proc,0}$) 111 to obtain sensing results (e.g., a contiguous partial sensing), where T$_{proc,0}$ is a UE processing time to decode physical sidelink control channel (PSCCH) to obtain a sidelink control information (SCI) with resource assignment and reservation information, and to measure a corresponding reference signal received power (RSRP) level. But to ensure there are sufficient resources available for re-selection in case when the initially selected resource

109 is reserved or taken over by another UE (i.e., no longer part of the remaining candidate resources set reported to the higher layer), one or a combination of the following methods can be adopted.

1. During the initial resource selection of the set of resources (e.g. 107, 108 and 109) for the sidelink grant for SL transmission of a MAC PDU/TB based on a reported subset of resources from the UE (physical layer) (e.g., in slot (n) 101), the higher layer select the earliest resources or prioritize earlier resources within the reported subset of resources and/or Y candidate slots for selection, so that it leaves room for any subsequent resource re-selection process due to re-evaluation and/or pre-emption and any other resource re-selection triggers due to changes in TBS, priority, latency and etc.

2. A resource selection window for re-evaluation and pre-emption can be confined within the selected Y candidate slots [$t_{y_0}$, $t_{y_0}+Y-1$] to ensure the entire portion of the resource selection window is still covered by pre-sensing results obtained from the periodic-based partial sensing performed by the UE, wherein $t_{y_0}$ is the starting slot position/number of the selected Y candidate slots. For example, the resource selection window for re-evaluation and pre-emption is the remaining portion of the selected Y candidate slots [$t_{y_0}$, $t_{y_0}+Y-1$].

3. Extend the resource selection window (RSW) 112 beyond the ending boundary 104 of the Y candidate slots 102 for up to slot $$m - T_3 - T_{proc,0}^{SL} + 31$$

114, such that the extended portion can still be covered by the pre-sensing results from the contiguous partial sensing, and the exact amount of RSW extension if up to UE implementation, wherein:

Starting of the RSW 112 can be the slot m−T$_3$+T$_1$ 113, where T$_1$ is to be selected by the UE between 0 and $$T_{proc,1}^{SL},$$

and $$T_{proc,1}^{SL}$$

is UE processing time for preparing a SL transmission.

The number of slots for $$T_{proc,0}^{SL}$$

is selected from a set of values [1, 1, 2, 4] depending on the configured SCS for the SL bandwidth part in which the SL resource pool is configured.

The extension of the RSW could be further conditioned if the following is satisfied: $t_{y_0}+Y-1-m$ is smaller or equal to 20% of Y.

In summary, exemplarily resource (re-)selection methods for periodic-based partial sensing (due to re-evaluation and pre-emption) are disclosed. In periodic-based partial sensing, especially when it is used for selecting or re-selecting TX resources for periodic sidelink transmission of a MAC PDU/TB in a sidelink resource pool that supports reservation of TX resources for another/different TB, the UE performs monitoring (i.e., pre-sensing prior to an initial resource (re-)selection trigger) of resource usage and reservation status of the SL resource pool in periodic sensing occasions that correspond to a set of Y candidate slots selected during an initial selection of a set of TX resources for the periodic sidelink transmission. In order to resolve a problem of potentially insufficient amount of available resources for re-selection within the Y candidate slots (e.g., due to re-evaluation and pre-emption checking), it is proposed one or a combination of the following methods for (re)selecting resources and defining the resource selection window during the resource (re-)selection procedure: For example, resource selection window for re-evaluation and pre-emption can be confined within the selected Y candidate slots $[t_{y_0}, t_{y_0}+Y-1]$ to ensure the entire portion of the resource selection window is still covered by pre-sensing results obtained from the periodic-based partial sensing performed by the UE, wherein $t_{y_0}$ is the starting slot position/ number of the selected Y candidate slots. In addition, the UE monitors slots belong to the SL resource pool within a sensing interval contiguously from slot (m−31) to slot $(m-T_3-T_{proc,0})$ to obtain sensing results (e.g., a contiguous partial sensing).

Commercial interests for some embodiments are as follows. 1. Solving issues in the prior art. 2. Ensuring an entire portion of a resource selection window is covered by sensing results obtained from a periodic-based partial sensing performed by the UE. 3. Avoiding transmission collision. 4. Providing good communication performance. 5. Providing high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, smart watches, wireless earbuds, wireless headphones, communication devices, remote control vehicles, and robots for public safety use, AR/VR device maker for example gaming, conference/seminar, education purposes, smart home appliances including TV, stereo, speakers, lights, door bells, locks, cameras, conferencing headsets, and etc., smart factory and warehouse equipment including IIoT devices, robots, robotic arms, and simply just between production machines. In some embodiments, commercial interest for the disclosed invention and business importance includes lowering power consumption for wireless communication means longer operating time for the device and/or better user experience and product satisfaction from longer operating time between battery charging. Some embodiments of the present disclosure are a combination of "techniques/processes" that can be adopted in 3GPP specification to create an end product. Some embodiments of the present disclosure relate to mobile cellular communication technology in 3GPP NR Release 17 and beyond for providing direct device-to-device (D2D) wireless communication services.

Figure 6:
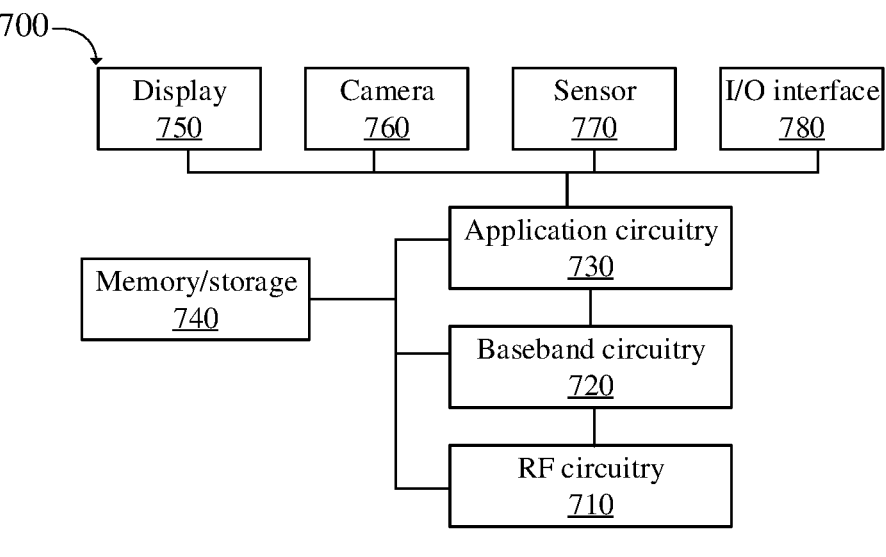
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage

740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations can not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A resource monitoring method in sidelink communication by a user equipment (UE), comprising:

being triggered, by a higher layer, to determine a subset of resources in a first resource selection window as a part of a re-evaluation and pre-emption checking procedure, wherein the first resource selection window is within a set of candidate slots; and sensing slots of a sidelink resource pool within a time interval contiguously from a slot (m−31) to a slot $(m-T_3-T_{proc,0})$ to obtain sensing results as a part of a contiguous partial sensing, where the UE is triggered to determine the subset of resources in a slot (n) as the part of the re-evaluation and pre-emption checking procedure and m is a smallest candidate resource slot index after slot $(n+T_3)$.

2. The method of claim 1, wherein the set of candidate slots of a length Y starting from a slot $(t_{y_0})$ and/or ending at a slot $(t_{y_0}+Y-1)$ is used in an initial resource selection.

3. The method of claim 1, wherein the first resource selection window is a remaining portion of the set of candidate slots.

4. The method of claim 1, wherein the time interval is within the set of candidate slots.

5. The method of claim 1, wherein the time interval is within the first resource selection window.

6. The method of claim 1, wherein the higher layer selects earliest resources or prioritize earlier resources within the subset of resources and/or the set of candidate slots for selection.

7. The method of claim 1, further comprising being triggered, by the higher layer, to determine the subset of resources in a second resource selection window as the part of the re-evaluation and pre-emption checking procedure.

8. The method of claim 7, wherein the second resource selection window exceeds an ending boundary of the set of candidate slots.

9. The method of claim 8, wherein the second resource selection window exceeds an ending boundary of the set of candidate slots for up to a slot $$\left(m - T_3 - T_{proc,0}^{SL} + 31\right).$$

10. The method of claim 9, wherein a starting of the second resource selection window is a slot $(m-T_3+T_1)$, where $T_1$ is to be selected by the UE between 0 and $$T_{proc,1}^{SL}.$$

11. The method of claim 9, wherein a number of slots for $$T_{proc,0}^{SL}$$

is selected from a set of values [1, 1, 2, 4] depending on a configured subcarrier spacing (SCS) for a sidelink bandwidth part in which the sidelink resource pool is configured.

12. The method of claim 9, wherein for the second resource selection window, $t_{y_0}+Y-1-m$ is smaller or equal to 20% of Y.

13. A user equipment (UE), comprising:
   a memory;
   a transceiver; and
   a processor coupled to the memory and the transceiver;
   wherein the processor is configured to:
   be triggered, by a higher layer, to determine a subset of resources in a first resource selection window as a part of a re-evaluation and pre-emption checking procedure, and the first resource selection window is within a set of candidate slots; and
   sense slots of a sidelink resource pool within a time interval contiguously from a slot $(m-31)$ to a slot $(m-T_3-T_{proc,0})$ to obtain sensing results as a part of a contiguous partial sensing, where the UE is triggered to determine the subset of resources in a slot (n) as the part of the re-evaluation and pre-emption checking procedure and m is a smallest candidate resource slot index after slot $(n+T_3)$.

14. The UE of claim 13, wherein the set of candidate slots of a length Y starting from a slot $(t_{y_0})$ and/or ending at a slot $(t_{y_0}+Y-1)$ is used in an initial resource selection.

15. The UE of claim 13, wherein the first resource selection window is a remaining portion of the set of candidate slots.

16. The UE of claim 13, wherein the time interval is within the set of candidate slots.

17. The UE of claim 13, wherein the time interval is within the first resource selection window.

18. A non-transitory machine-readable storage medium having stored thereon instructions that, when executed by a computer, cause the computer to perform operations of:
   being triggered, by a higher layer, to determine a subset of resources in a first resource selection window as a part of a re-evaluation and pre-emption checking procedure, wherein the first resource selection window is within a set of candidate slots; and
   sensing slots of a sidelink resource pool within a time interval contiguously from a slot $(m-31)$ to a slot $(m-T_3-T_{proc,0})$ to obtain sensing results as a part of a contiguous partial sensing, where the UE is triggered to determine the subset of resources in a slot (n) as the part of the re-evaluation and pre-emption checking procedure and m is a smallest candidate resource slot index after slot $(n+T_3)$.

\* \* \* \* \*